United States Patent [19]

Coyle et al.

[11] Patent Number: 5,003,463

[45] Date of Patent: Mar. 26, 1991

[54] INTERFACE CONTROLLER WITH FIRST AND SECOND BUFFER STORAGE AREA FOR RECEIVING AND TRANSMITTING DATA BETWEEN I/O BUS AND HIGH SPEED SYSTEM BUS

[75] Inventors: Richard W. Coyle, Dunstable; Zenja Chao, North Andover, both of Mass.; Thomas B. Berg, West Lafayette, Ind.

[73] Assignee: Wang Laboratories, Inc., Lowell, Mass.

[21] Appl. No.: 213,401

[22] Filed: Jun. 30, 1988

[51] Int. Cl.$^5$ .................. G06F 3/00; G06F 13/00; G06F 13/12; G06F 15/16

[52] U.S. Cl. .................. 364/200; 364/228.5; 364/238; 364/238.3; 364/239; 364/239.4; 364/239.6; 364/239.7; 364/240; 364/240.3; 364/251.3; 364/270.2

[58] Field of Search .......... 364/200, 900; 307/475, 307/522; 370/94, 60

[56] References Cited

U.S. PATENT DOCUMENTS

| | | |
|---|---|---|
| 4,266,281 | 5/1981 | Struger et al. |
| 4,271,518 | 6/1981 | Birzele et al. .......... 364/200 |
| 4,322,794 | 3/1982 | Kurakake . |
| 4,371,925 | 2/1983 | Carberry et al. |
| 4,396,995 | 8/1983 | Grau .......... 364/900 |
| 4,442,504 | 4/1984 | Dummermuth et al. |
| 4,466,079 | 8/1984 | Daniels et al. .......... 364/900 |
| 4,475,155 | 10/1984 | Oishi et al. .......... 364/200 |
| 4,523,274 | 6/1985 | Fukunaga et al. .......... 364/200 |
| 4,527,233 | 7/1985 | Ambrosius, III et al. .......... 364/200 |
| 4,528,626 | 7/1985 | Dean et al. .......... 364/200 |
| 4,538,224 | 8/1985 | Peterson .......... 364/200 |
| 4,604,682 | 8/1986 | Schwan et al. .......... 364/200 |
| 4,644,194 | 2/1987 | Birrittella et al. .......... 307/475 |
| 4,695,948 | 9/1987 | Blevins et al. |
| 4,771,191 | 9/1988 | Estrada .......... 307/475 |
| 4,809,217 | 2/1989 | Floro et al. .......... 364/900 |
| 4,821,179 | 4/1989 | Jensen et al. .......... 364/200 |

*Primary Examiner*—David Y. Eng
*Assistant Examiner*—George C. Pappas
*Attorney, Agent, or Firm*—Michael H. Shanahan

[57] ABSTRACT

An information processing system comprises a high speed noninterlocked system bus 12 which couples together a plurality of system units including a main memory and a system bus interface (SBI) unit 34. The system bus interface unit is further coupled to an I/O bus 42 having a plurallity of I/O Processors 44, 46 coupled thereto. The system bus interface includes read and write buffer storage for buffering information units being transferred between the system bus and the I/O bus. The I/O bus includes two signal lines which differentiate the condition of an I/O bus SBI BUSY signal line. One of these two signal lines indicates when the SBI read buffer is full while the other signal line indicates when the SBI write buffer is full. The SBI Busy signal line indicates when either of these conditions exist. I/O processors are enabled to differentiate between read and write buffer full conditions, thereby effectively increasing the bandwidth of the I/O bus.

2 Claims, 12 Drawing Sheets

| 00 | 03 04 | 11 12 | 15 16 | 31 |
|---|---|---|---|---|
| RESVD | TARGET 8 | MESSAGE TYPE 4 | 2-BYTE MESSAGE 16 | |

FIG. 4a

| 0 | 3 4 | 11 12 | 15 16 | 31 |
|---|---|---|---|---|
| RESVD | CPU ID 8 | COMMAND 4 | 2-BYTE MESSAGE 16 | |

FIG. 4b

| 0 | 3 4 | 11 12 | 15 16 | 19 20 | 31 |
|---|---|---|---|---|---|
| RESVD | SBI ID 8 | COMMAND 4 | IOC ID 4 | SPARE 12 | |

FIG. 4c

| 0 | 3 4 | 11 12 | 15 16 | 31 |
|---|---|---|---|---|
| RESVD | CPU ID 8 | COMMAND 4 | 2-BYTE MESSAGE 16 | |

FIG. 4d

| 0 | 3 4 | 11 12 | 15 16 | 19 20 | 31 |
|---|---|---|---|---|---|
| RESVD | SBI ID 8 | COMMAND 4 | IOC ID 4 | SPARE 12 | |

FIG. 4e

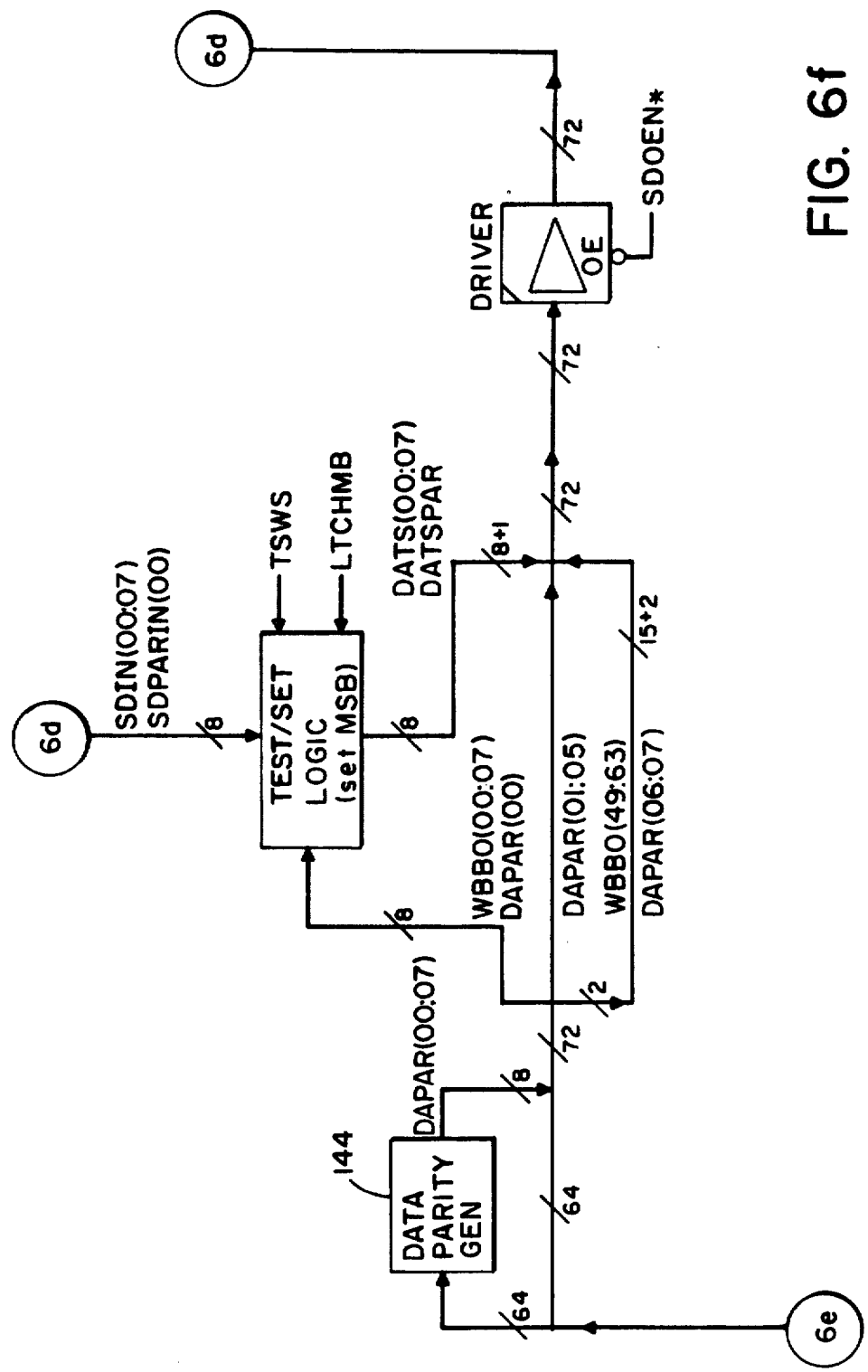

INTERFACE CONTROLLER WITH FIRST AND SECOND BUFFER STORAGE AREA FOR RECEIVING AND TRANSMITTING DATA BETWEEN I/O BUS AND HIGH SPEED SYSTEM BUS

FIELD OF THE INVENTION:

This invention relates generally to an information processing system and, in particular, to an interface between an IO bus and a high speed system bus.

BACKGROUND OF THE INVENTION:

In modern information processing systems an important consideration is the interface between a plurality of I/O devices, such as mass storage devices and telecommunications peripherals, and the system main memory. The main memory may be coupled to a high speed, high performance central system data and address bus. The system bus is typically also coupled to other high speed system units, or bus connections, such as one or more central processing units (CPUs) and cache memory systems associated with the CPUs. Thus, a problem is created in that the I/O devices typically source or sink data at least an order of magnitude more slowly than these high speed bus connections. In order to achieve a maximum system bus bandwidth the interface between the I/O devices and the main memory or other system bus connections is therefore preferably not a direct interface. That is, the I/O devices are preferably not directly coupled to the system bus but are provided with an IO BUS which, is especially adapted for I/O-type data transfers. It can be appreciated that in a system having such an IO BUS that a bus connection which bidirectionally couples the IO BUS to the system bus is required to accommodate the differences in speed and other operating characteristics between the two buses.

One operating characteristic which may exist between the two buses may relate to differences in bus voltage potentials. For example, if the high speed system bus were implemented with emitter coupled logic (ECL) devices while the IO BUS was implemented with transistor-transistor logic (TTL), or equivalent, devices the differences between bus operating voltages makes a direct interconnection between the ECL bus and the TTL bus impossible to achieve.

Furthermore, if the bus connection which couples the IO BUS to the system bus has storage for buffering data, or information units, which pass between the system bus and the IO BUS then it is known to provide the IO BUS with a signal line for informing the IO Processors when the storage is full. Inasmuch as the storage preferably provides both read and write buffers it can be appreciated that it would be desirable to differentiate between a condition wherein only the read buffer is full and not the write buffer, and vice versa. Thus, IO Processors which desire to write data to the system bus are not inhibited from writing data during a time when only the read buffer is full. Conversely, IO Processors which desire to read data from the system bus are not inhibited during a time when only the write buffer is full.

SUMMARY OF THE INVENTION

The foregoing problems are overcome and other advantages are realized by an information processing system constructed and operated in accordance with the invention. In a preferred embodiment of the invention there is disclosed an interface unit for bidirectionally coupling an IO bus to a system bus, the IO bus having one or more IO Processing means coupled thereto for receiving information units from and for transmitting information units to the IO bus. The interface unit comprises a first interface means, coupled to the IO bus, for transmitting information units thereto and for receiving information units therefrom and a second interface means, coupled to the system bus, for transmitting information units thereto and for receiving information units therefrom. The interface unit further comprises a first storage means, having an input coupled to the first interface means, for storing a first predetermined number of information units received from the IO bus, the first storage means further having an output coupled to the second interface means for outputting stored information units to the system bus. The interface unit further comprises a second storage means having an input coupled to the second interface means for storing a second predetermined number of information units received from the system bus, the second storage means further having an output coupled to the first interface means for outputting stored information units to the IO bus. The interface unit further comprises a first asserting means having an input coupled to the first storage means and an output coupled to a first signal line of the IO bus; the first asserting means being responsive to a full condition of the first storage means, wherein the first storage means has stored therein the first predetermined number of information units, for asserting on the first signal line a signal expressive of the first storage means being full. The interface unit further comprises a second asserting means having an input coupled to the second storage means and an output coupled to a second signal line of the IO bus; the second asserting means being responsive to a full condition of the second storage means, wherein the second storage means has stored therein the second predetermined number of information units, for asserting on the second signal line a signal expressive of the second storage means being full.

BRIEF DESCRIPTION OF THE DRAWINGS

The foregoing aspects of the invention will be made more apparent in the following detailed description of a preferred embodiment read in conjunction with the accompanying drawing wherein:

FIGS. 4a-4e show various data fields used in the transmission of Interprocessor Communication (IPC) commands;

FIGS. 6a-6f are block diagrams which illustrate the System Bus Interface of the invention.

DETAILED DESCRIPTION OF A PREFERRED EMBODIMENT

Figure 1:
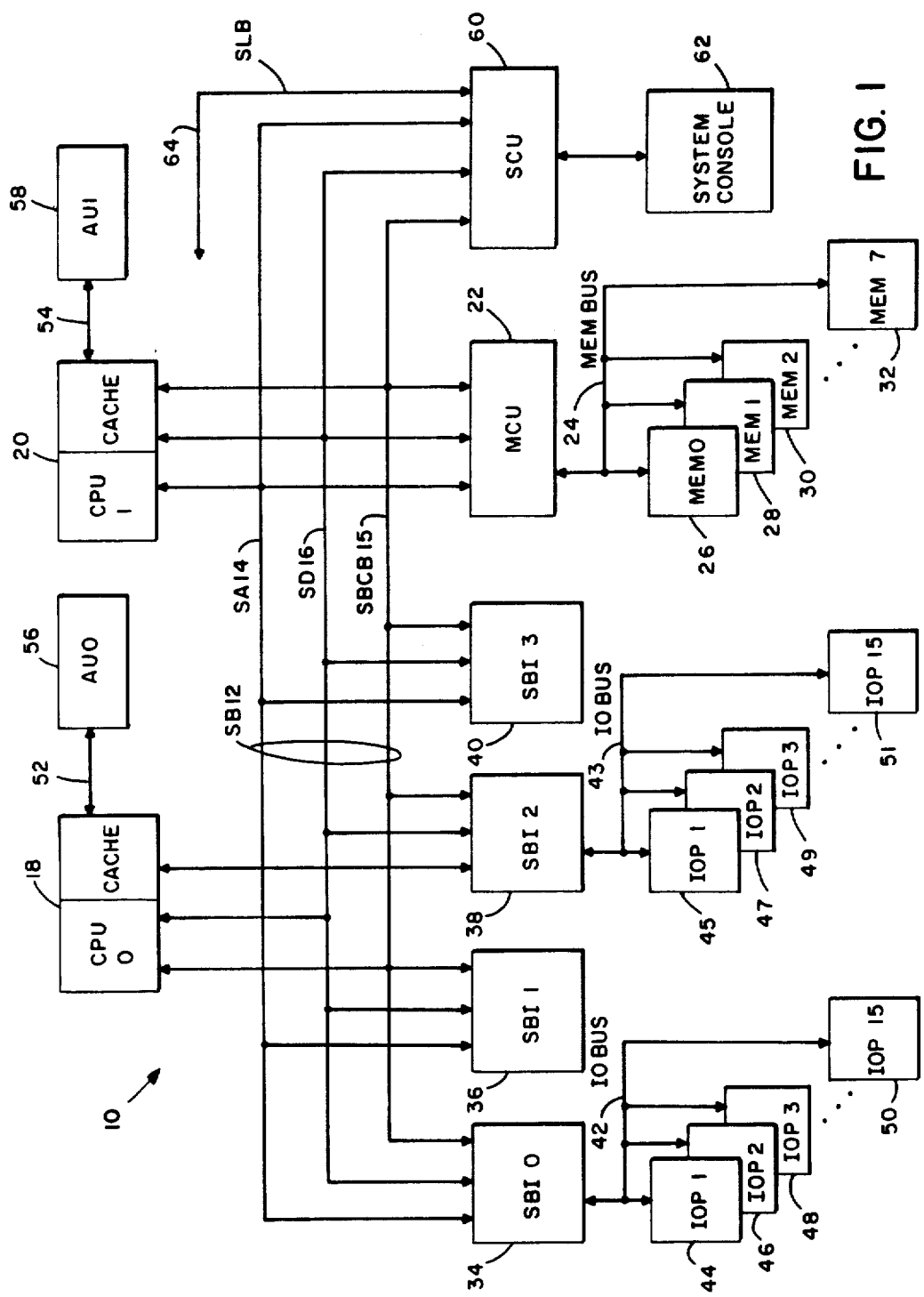
FIG. 1 is a block diagram of an information processing system incorporating the present invention.

Referring to FIG. 1 there is shown an information processing system (SYSTEM) 10 incorporating a preferred embodiment of the invention. As seen, SYSTEM 10 comprises a System Bus (SB) 12 which further comprises a System Address Bus (SA) 14, a System Bus Control Bus (SBCB 15) and a System Data (SD) bus 16. SB 12 functions to convey information units between the various components of the SYSTEM 10. Information units may be addresses, I/O input or output data, operands, instructions or any other type of information which passes between the components of the SYSTEM 10. In the preferred embodiment of the invention SB 12 is a high speed, non-interlocked bus which operates at ECL voltage levels. Typically, logic signals on the bus swing between approximately −0.9 volts and −1.8 volts.

Coupled to System Bus 12 are a plurality of system units, or bus connections, which include a first central processing unit (CPU0) 18 and an optional second CPU1 20. Also coupled to SB 12 is a memory control unit (MCU) 22 which has coupled thereto via a memory bus 24 one or more memory boards, such as MEM0 26, MEM1 28 and MEM2 30. In the preferred embodiment of the invention MCU 22 may be coupled to up to eight memory boards, such as the MEM7 32. Each memory board may store from, for example, four million bytes (4MB) to 128 MB of information depending upon the type and quantity of memory devices installed. SB 12 also has coupled thereto one or more system bus interface (SBI) units, such as the SBI0–SBI3, 34, 36, 38 and 40, respectively. Each of the SBIs is further coupled to an associated I/O data bus (IODB), such as the IODBs 42 and 43 coupled to SBI0 34 and SBI1 36, respectively. Each IODB in turn has coupled thereto up to fifteen intelligent I/O processors (IOPs), such as the IOPs 44–50 and IOPs 45–51. In the preferred embodiment of the invention the IODBs 42 and 43 operate at TTL levels. That is, logic signals on these buses swing between approximately zero volts and +5.0 volts.

CPU0 18 and CPU1 20 each comprise an associated high speed cache memory and are each further coupled via a cache data bus (CDB) 52 and 54, respectively, to an arithmetic unit (AU0) 56 and AU1 58, respectively. Also coupled to SB 12 is a support control unit (SCU) 60 having a system console (SC) 62 coupled thereto. A support link bus (SLB) 64 provides access and communications from the SC 62, via SCU 60, to the various bus connections coupled to the SB 12. Diagnostic and other information, such as system initialization data, is generally provided over SLB 64. Each bus connection, such as SBI0 34, comprises a support control unit interface (SCUI) device 170 (FIG. 6e) which is coupled to SLB 64 and which is adapted to receive and transmit data over SLB 64. In a preferred embodiment of the invention SLB 64 comprises a bidirectional data line and a control line. Information on the control line indicates the source/destination of a particular SLB 64 data transaction. During the following 16 clock cycles data is transmitted in the indicated direction over the bidirectional data line. The system console 62 may be a computer or any device suitable for transmitting data to and receiving data from the SYSTEM 10.

In general, the CPUs 18 or 20 generate virtual memory addresses which are translated into physical addresses and issued over SA bus 14. Addresses are received and interpreted by MCU 22 for addressing, via the memory bus 24, instructions and data which are stored in the memory boards 26–32. Data and instructions are read and written over the SD bus 16 in accordance with the information conveyed by SBCB 15. Furthermore, SBIs 34–40 are also operable for transferring memory addresses and data over the system bus 12 for storing within and retrieving data from the memory boards 26–32. It should be realized that one or more of the IOPs 44–51 may be coupled to up to four mass storage devices such as a magnetic disk. Also, some of the IOPs may be coupled to data communications means operable for inputting and outputting data from the system 10. The IOPs may also be coupled to operator workstations where an operator enters data into the system.

In order to facilitate the description of the invention the operation of the SB 12 will now be described in further detail.

SB 12 is a synchronous, non-interlocked bus having a 64 bit data path and a 28 bit address path. SB 12 provides a peak interconnect bandwidth of 200 Mb/sec. and is, as previously mentioned, comprised of emitter coupled logic (ECL) drivers and receivers.

The following signals describe the System Bus 12 operation and protocol.

System Data (SDATA(0:63)) System Data Bus 16. All memory data traffic to and from bus connections is transferred via these 64 lines. In accordance with the invention when the CMD Flag, to be described, is asserted then certain of these lines are used to transmit Command-ID information, as described below in relation to CMD and ID.

Data Parity (SDPAR(0:7)) Odd Data Parity. One parity bit for each data byte, eight total, of SDATA 16.

System Address (SA(04:31)) System Address Bus. A bus connection transmits during a memory read or write cycle a memory address to the MCU 22 via these 28 lines. The MCU 28 thereafter drives these lines with the address of data read one bus cycle before the data is driven on the bus. Write-back caches coupled to the SB 12 use the MCU 22 driven address to make directory comparisons to determine if bus intervention is required and also drive the address lines during a cache re-transmission. Also, the system address lines, during an IPC transaction (to be described), convey the IPC message and other IPC related data.

Address Parity (SAPAR) Odd Address Parity bit.

Command Flag (CMDF) This line, when asserted by a bus connection, indicates that the SDATA Bus 16 is being used by the bus connection to transmit Command-ID information. When this line is not asserted and the bus is valid as indicated by BUSVLD, described below, CMDF indicates that SDATA 16 is transmitting data.

Command (CMD) During a bus cycle when CMDF is asserted a bus connection places the type of command on SDATA [48:55]to initiate a memory operation or, in the case of the MCU 22, to return data to a requesting bus connection. The eight bit CMD field encodes the type of bus operation.

In the preferred embodiment of the invention the various types of bus operations encoded by the CMD field are as follows.

OPERATION

No Operation
Read Double Word
Read Quad Word

Read Octal Word
Write Byte
Write Word
Write Double Word
Data Return (transmission from MCU)
Transmit IPC
Read MCU
Write MCU Other signals which comprise the SB 12 are as follows.

ID Each bus connection has a unique identifier (ID). During a bus cycle when a bus connection asserts CMDF the bus connection drives its unique ID onto SDATA [56:63]along with the bus command (CMD) on SDATA [48:55]. The MCU 22 drives the previously received and buffered ID of a bus connection which made a memory request when the data is returned to the requesting bus connection. During the assertion of a Transmit IPC command on SDATA[48:55]a bus connection drives the ID of the target of the IPC command on SDATA[56:63].

Busy (BSY) This signal line is asserted by a bus connection during all cycles of a bus operation except the last cycle. BSY is sampled at the end of each bus cycle by all connections wishing to use the bus and indicates, when asserted, that the bus is in use and is unavailable to other bus connections. In accordance with one aspect of the invention during a START IO IPC command directed to an IOP through an associated SBI the SBI continues to drive the BUSY line until communication is established with the target IOP and a determination is made as to whether the IOP has accepted the START IO command.

Bus Valid (BUSVLD) This signal is asserted by a bus connection when valid information is placed on the bus.

Lock (LOCK) Asserted by a bus connection when it is desired to prevent other bus connections (except the MCU 22) from using the bus. This signal line is utilized to implement semaphore instructions that perform read-modify-write operations.

CPU Hold (CPUHLD) Two CPUHLD signals are provided, one for each CPU. This signal is generated by a CPU and is sampled at the end of each bus cycle by all other bus connections. This signal indicates that one of the write-back caches may be either retransmitting MCU 22 data or may be updating stored information. CPUHLD has the same effect as BSY; it indicates that the bus is still in use and unavailable to all other bus connections. Like BSY, CPUHLD is deasserted one cycle before the last bus cycle. It is also used by a CPU to interlock fetch/writeback operations for the cache.

MCU Hold (MCUHLD) Generated by the MCU and sampled at the end of each bus cycle by all other bus connections. This signal indicates that the MCU has detected a correctable error and will be retransmitting the data in corrected form. The system bus protocol for MCUHLD is similar to that of CPUHLD. In accordance with another aspect of the invention the SBI is responsive to the assertion of both CPUHLD and MCUHLD and a subsequent data transmission to overwrite previously received and buffered data.

Write Acknowledge (WACK) Acknowledge generated by the MCU 22 in response to Write operations in the bus cycle following the data cycle and by target devices in response to Interprocessor Communication (IPC) operations.

Target Busy (TB) This signal is generated by a target device in response to an IPC transmission. TB being asserted indicates that the target is busy and that the transmission was not accepted.

Bus Error (BUSER) Asserted by any bus connection detecting a bus error.

Mem Exception (MEMX) Asserted by the MCU during the cycle following address transmission if an Invalid Memory Address is received or during the cycle following data transmission if a double bit, uncorrectable, memory error occurs during a memory read.

Xmit Rq In/Xmit Rq Out (XROI/XRQO) This signal is daisy chained between bus connections. A bus connection wishing to use the bus will assert Xmit Rq Out and start transmitting on the next cycle only if the following conditions are met:
Xmit Rq In from its higher neighbor is false;
Busy is False;
Hold is False; and
LOCK is False (Only if not an MCU).

A bus connection passes Xmit Rq In from its higher priority neighbor to Xmit Rq Out which is connected to its lower priority neighbor.

The timing diagrams of FIG. 3 illustrate various types of bus transactions including the operation of the multiplexed Command/ID and data path having an associated address which is presented during a bus cycle which precedes the presentation of data on SDATA 16. In the timing diagrams of FIGS. 3a-3c signal timing is referenced to the period of the system clock (CLK) signal, the clock period representing approximately one bus cycle. In a preferred embodiment of the invention the basic timing unit or time interval, that is the period of CLK, is approximately 40 nanoseconds.

Figure 3D:
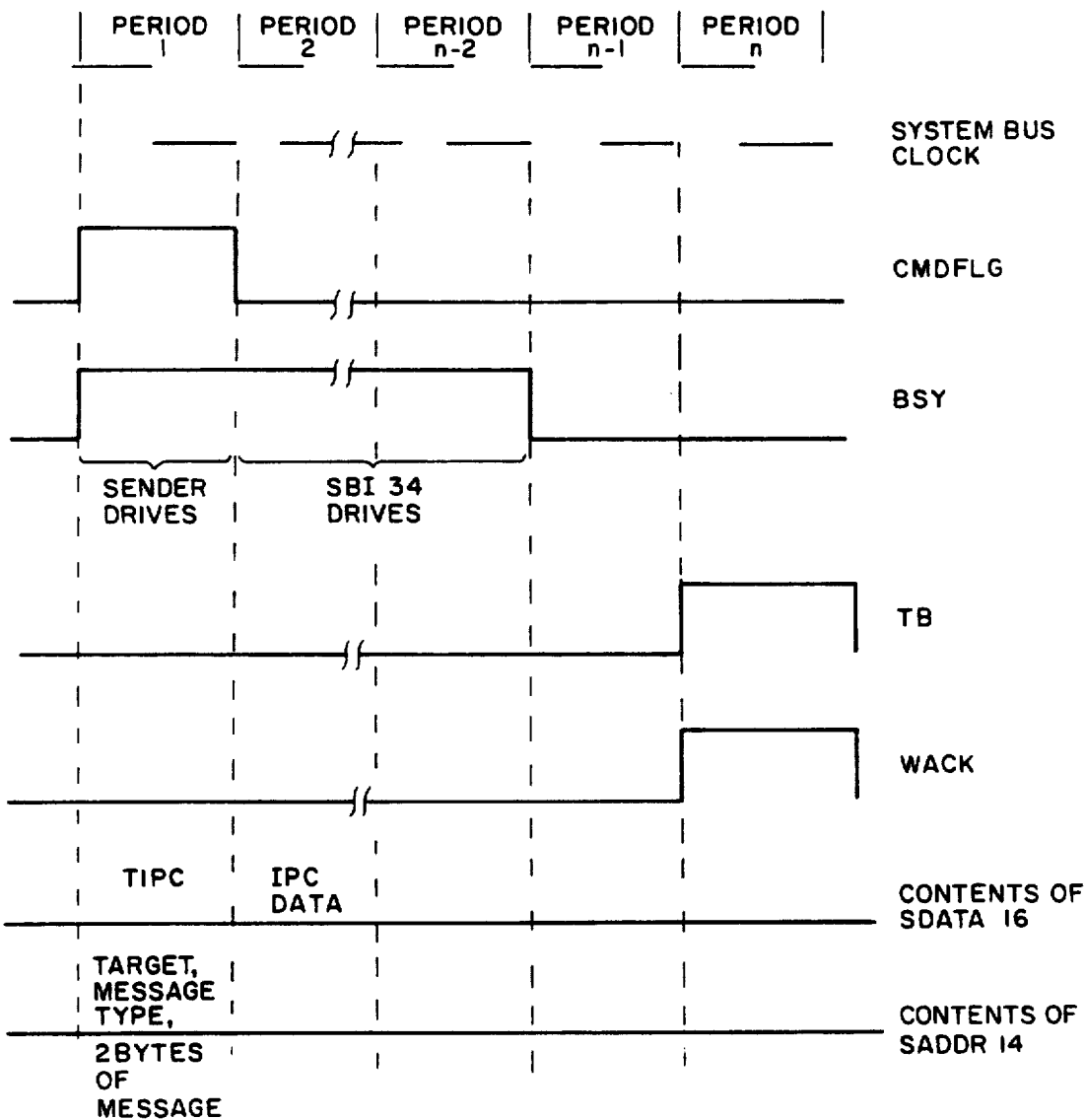
FIG. 3d is a timing diagram which illustrates the operation of the system bus BSY signal line during an IPC operation which targets an IOP.
Figure 3A:
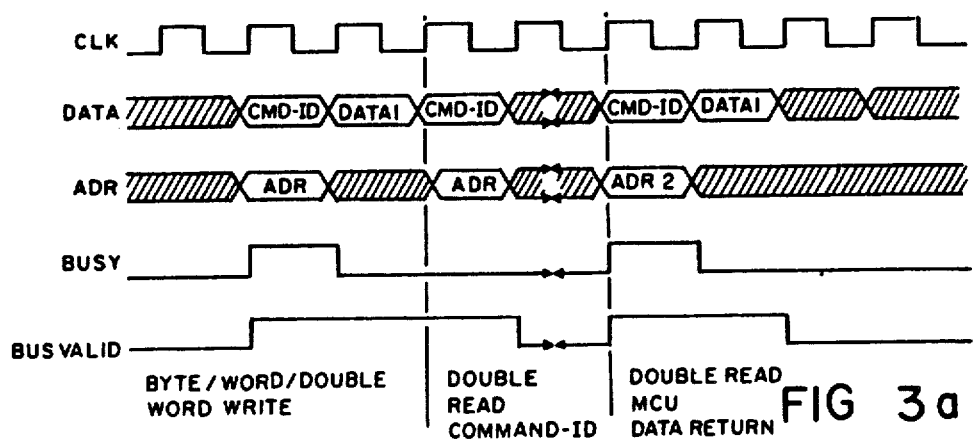
FIGS. 3a-3c are timing diagrams which illustrate the operation of the non-interlocked system bus.

FIG. 3a shows a byte/word/double word write immediately followed by the Command-ID portion of a double word (64 bit) read followed by an MCU data return of the requested double word.

Figure 3B:
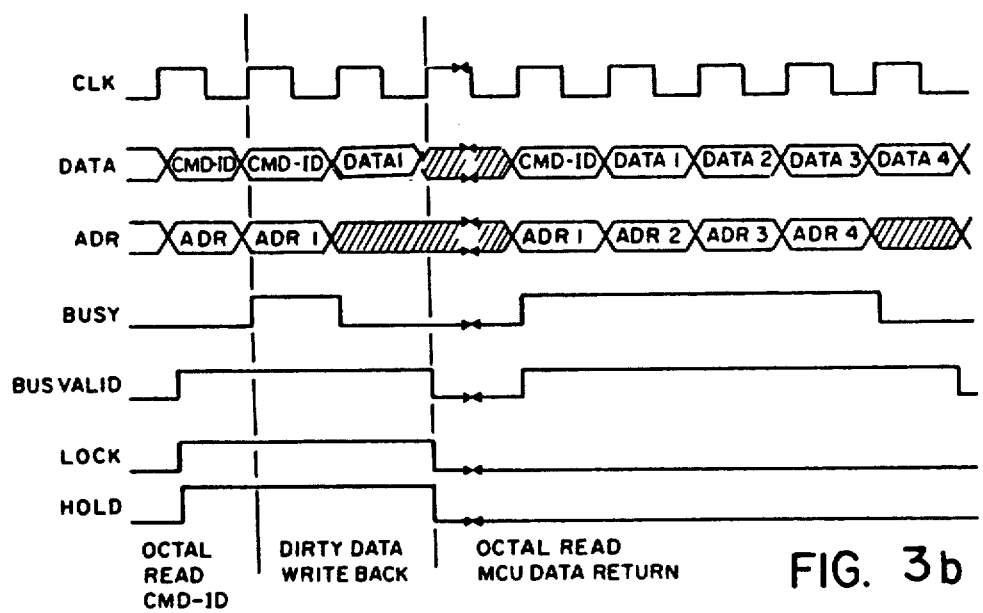
Figure 3C:
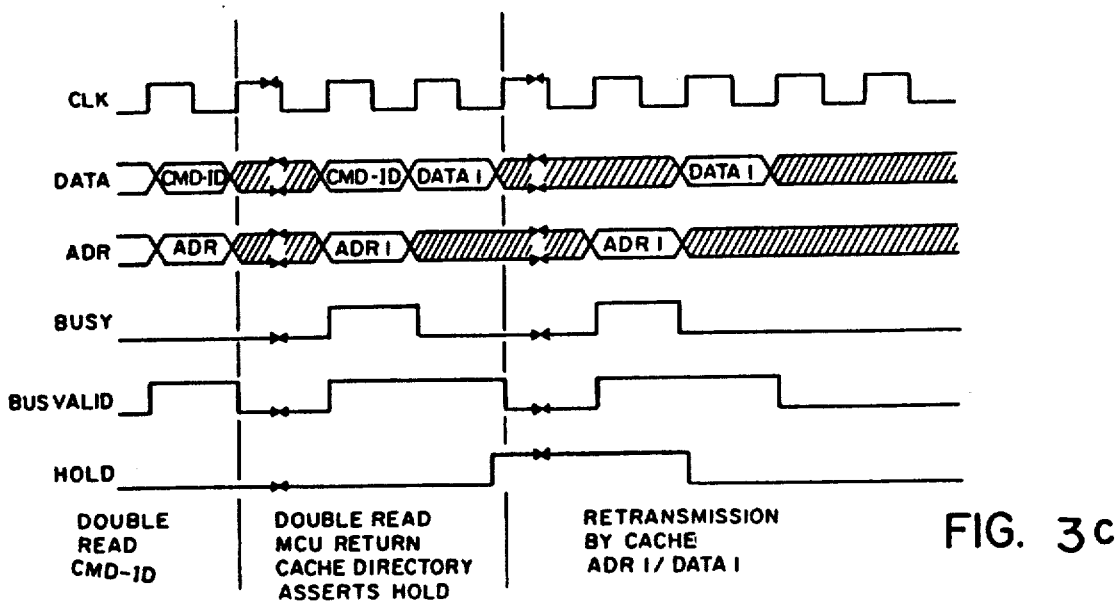

FIG. 3b demonstrates the use of CPUHLD for a cache fetch/writeback. A CPU is shown sending Command-ID information to the MCU 22 for an octal word read and thereafter a double word cache write-back. The MCU 22 responds with the return of four double words. CPUHLD prevents another bus connection from using the bus during this sequence. FIG. 3c further demonstrates the use of the CPUHLD line. A bus connection is shown requesting a double word read and the MCU 22 returning the requested double word. The cache or caches latch the address of the double word, and do directory look-ups in the following cycle. If a "dirty" match is found by a cache, that cache asserts CPUHLD shortly before the end of the cycle. The CPUHLD line prevents other connections from using the bus until the write-back cache re-transmits the double word along with its address and thereafter releases CPUHLD. BSY is asserted during the first cycle of retransmission and BUSVLD is asserted for two cycles if retransmission is performed.

The Interprocessor Communication (IPC) facility allows bus connections to directly communicate with one other by sending IPC messages. The bus protocol for sending these messages resembles a Write operation except that the Transmit IPC command is used instead of a Write command. The address that is transmitted along with the Command ID lines has the format indicated in FIG. 4a. The state of the eight Target field bits specifies the following targets, it being remembered that the target ID is provided in the ID field of SDA-TA[56:63].

TARGET

SCU
CPU0
CPU1
SBI0
SBI1
SBI2
SBI3

The 64 bit SDATA bus is used to transmit additional optional message data as required by the various IPC message types.

The System Bus IPC operations can be divided into three general categories. One category enables an IOP to initiate IPC operations through an SBI by asserting a predefined code on the IO BUS 42. The format of the IPC as generated by the SBI 34 on the SB 12 is shown in FIG. 4b.

The state of the command field format defines the following types of operations.

COMMAND

Class 1 IO Interrupt
Class 2 IO
Inter-Processor Communication
Synchronize Clock

Another SB 12 IPC category enables a CPU to send a message to SBI 34 (and hence a specific IOP) using the format shown in FIG. 4c.

The state of the command field defines the following types of operations.

COMMAND

Data Transfer to IOP, Data Word
Data Transfer to IOP, Data Double Word
Clear I/O Interrupt (IPCR)
Message transfer to IOP, Message-Control
Message transfer to IOP, Message-Word(IPCR)
Reset target IOP
Reset target SBI A third SB 12 IPC category enables the Support Control Unit 60 to initiate IPC's. The SCU 60 transmits an IPC message to a CPU using the format shown in FIG. 4d.

The command field format defines the following types of operation.

COMMAND

Class 1 IO Interrupt
Class 2 IO Interrupt
Inter-Processor Communication
Synchronize Clock The SCU 60 may transmit an IPC message to the SBI 34 (and hence to an IOP) using the format shown in FIG. 4e.

The command field format defines the following types of operation, the commands being similar to that described above in relation to FIG. 4c.

Error Detection

There are four types of error detection mechanisms supported by the SB 12.

Data Parity Error Detection: There are eight Data Parity Bits on the 64 bit Data Bus (one parity bit for each byte).

Address Parity Error Detection: There is one Address Parity Bit on the 28 bit Address Bus.

Missing Acknowledge: The Acknowledge control line is used to acknowledge Write and IPC transactions. Read operations are acknowledged by the MCU Data Return Command-ID cycle on the bus.

Sequence Error: Illegal bus control sequences are detected by the bus connections involved in a particular bus transaction.

Bus connections detecting any of the above errors assert the Bus Error line for one system bus clock cycle only. This notifies the SCU 60 of the error. The SCU thereafter redrives the Bus Error signal until the SCU 60 clears the error condition. The bus connection also stores the type of error (errors) in an SCU 60 accessible error register.

The SBI 34 functions as an interface between the System Bus 12 and the IO BUS 42. It should be realized that SBIs 36–40 are identical in form and function to the SBI 34. SBI 34 communicates with the IOP's 44–50 through the IO BUS 42 and with the other system elements (such as the CPU0 18, MCU 22 and SCU 60) through the System Bus 12.

The IO BUS 42 supports up to 15 IO Processors across a 32 bit address/data multiplexed noninterlocked bi-directional bus. IO BUS 42 also comprises a number of device address lines which specify the I/O device address and a number of IO bus command lines which specify a type of IO BUS 42 operation.

The IO BUS 42 is synchronous and all bus transactions occur on the rising edge of a free running clock provided by the SCUI device on the SBI 34. The frequency of the IO BUS clock is generated by the SCUI 170 of SBI 34 from the system unit clock. One aspect of the invention is that the period of the IO bus clock is variable over a range of from approximately 100 nanoseconds to approximately 400 nsec by programming the SCUI device 170 from SC 62 via SCU 60 and SLB 64. The period of the IO bus clock has a "granularity" of approximately twice the system unit clock, or approximately 20 nanoseconds. This feature of the system bus interface permits IOP's capable of a higher speed operation to be coupled to one or more of the SBI's through an IO BUS and for the clock frequency of the IOP's to be set from the SC 62 upon system initialization. Furthermore, the IO bus clock may be turned off and on by suitable commands provided to the SCUI 170 over SLB 64. Thus, if desired the IOP's may be maintained in a dormant state during system initiation to prevent either spurious or unauthorized I/O activity. Once the system is properly initialized the IO clock of each IO BUS may then be enabled at a desired frequency.

The IO Processors support data block transfers between I/O devices coupled to the IO BUS 42 without involving system memory. Data also may be transferred between I/O devices located on different I/O buses within the same system through the SB 12.

Figure 5:
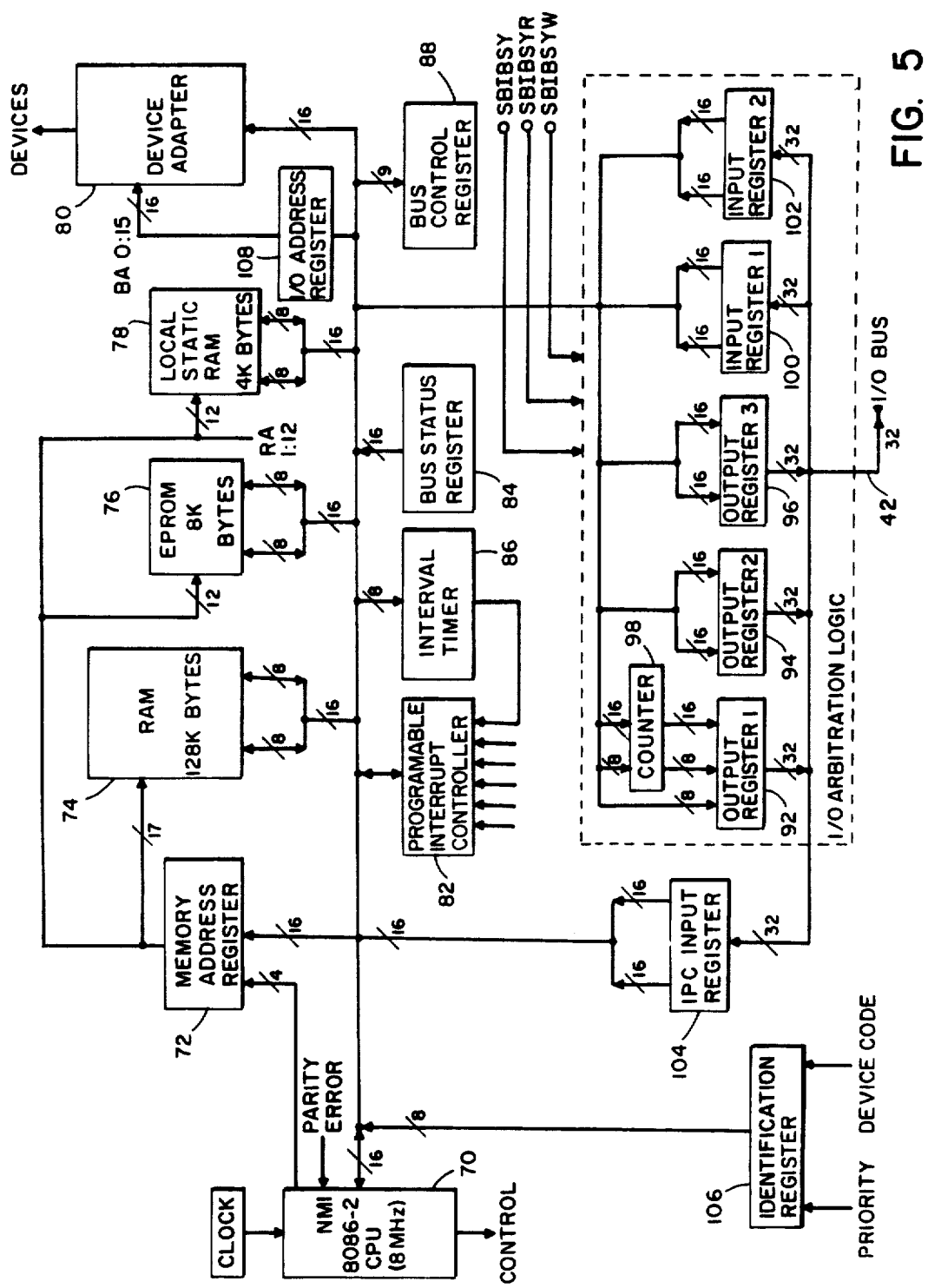
FIG. 5 is a block diagram of one of the IO Processors which is coupled to the IO BUS 42.

Referring now to the block diagram of FIG. 5 there is shown one of the IO Processors such as the IOP1 44. An IO Processor comprises a controlling means such as a microprocessor device 70. A memory address register 72 holds addresses generated by microprocessor 70. A control store comprises a random access memory (RAM) device and may have a typical capacity of 128 K. bytes. Program storage for the microprocessor 70 is provided by storage device 76 which may be a 8 K. byte EPROM. A local data storage means comprises a static RAM 78 which is shared between microprocessor 70 and a device adapter 80. The output of a programmable interrupt controller 82 is coupled to microprocessor 70. An interval timer 86 is clocked by the clock provided by the SBI 34 and is generally used as a "watchdog" timer to ensure that I/O BUS operations are completed. A bus status register 84 is generally used to report error and I/O bus status conditions. A bus control register 88 is utilized by microprocessor 70 to set up I/O bus control commands and control fields, such fields comprising commands and source/destination IO addresses. An I/O arbitration logic block 90 comprises the principle data interface to the IO BUS 42 and comprises a plurality of output registers (OR1 92, OR2 94 and OR3 96) which contain outgoing bus data. Preferably, OR1 contains a memory address while OR2 and OR3 contain memory data. A counter 98 is coupled to OR1 and is utilized to increment OR1 addresses. A pair of 32-bit input registers (IR1 and IR2, 100 and 102, respectively), are utilized to store incoming bus data. This data may be data read from main memory, self test data or data received from another IOP located either on the same IO bus or a different IO bus. The arbitration block 90 also has as inputs and is response to the states of the SBI BUSY, SBIBSYR and SBIBSYW I/O bus signal lines (described below). An IPC input register 104 stores incoming messages. Typically, an incoming message generates an interrupt to microprocessor 70. Subsequent messages are not stored until the current message is serviced by microprocessor 70. In general, messages may be provided to microprocessor 70 even while a device adapter is performing a DMA access to the main memory. An identification register 106 indicates the particular IOP bus priority, where IOP1 is defined to be the highest priority.

The device adapter 80 comprises logic which is specifically adapted for the particular type of IO device coupled thereto. As previously mentioned, these IO devices may be a disk, a tape, telecommunication type equipment or a serial data bus, such as an RS232 bus. Thus, the specific interfacing requirements for a particular IO device are accommodated by the device adapter 80. Coupler to device adapter 80 is an I/O address register 108 which stores an associated IO device address.

As has been previously stated, the IO BUS 42 is a synchronous bus, a clock provided by the SBI 34 defining IO BUS cycles and controlling all bus timing and transactions over the bus. The IO BUS 42 comprises the following signals. The column designated as "SOURCE" refers to the source of a given signal, unless the signal is defined to be bidirectional.

| MNEMONIC | SOURCE | FUNCTION |
| --- | --- | --- |
| IPCRDY | IOP | Inter-Processor Communication Ready. Generated by a destination IO Processor indicating to the SBI 34 the current state of the IO Processor's Register. A separate IPCRDY line is provided for each IO Processor. |
| IODB(0:31) | | Bi-directional I/O address/data bus. |
| C(0:3) | | Bi-directional signal used to specify an IO BUS command. |
| ID0 | | Bi-directional signal used to specify an IO BUS command. |
| ID(1:4) | | Bi-directional I/O identification bits used to indicate an IO Processor's slot position on the bus. |
| SELINIT | SBI | Causes an IO Processor to reset. The SBI 34 asserts this signal when it detects a "RESET TARGET I/O C" command on SB 12. |
| BCKO | SBI | Bus clock out. The IO Processor's master clock. All IO Processors use this clock to synchronize IO BUS 42 operations. The bus clock has an approximately 50% duty cycle with a nominal period of approximately 120 nanoseconds. BCKO is variable in frequency as previously described. |
| TIMER | SBI | A free-running clock generated by the SBI 34 which is used to increment the IO Processor's Interval Timer 86. The clock period is approximately 12.5 microseconds (80 KHz). |
| GRO | SBI | The Group enable signal is generated by the SBI 34 or one of the first seven I/O Processors and is used as an input signal to I/O Processors eight to fifteen. Assertion of this signal inhibits the I/O Processors's arbitration logic from gaining access to the IO BUS. |
| RQO1 | SBI | Request Out. This signal is generated by SBI 34 and is input to IO Processors one to seven. GRO, RQO1, HRQ(n) and LRQ(n) comprise the IO BUS priority mechanism. |
| IOHOLD | | A bi-directional signal used to extend the number of clock cycles for a device which has control of the IO BUS. Assertion of the IOHOLD line by a device prevents any other device from gaining access to the IO BUS. |
| IOACK | SBI | IO Acknowledge. |
| IOBUSY | SBI | IO BUSY. In the case of a SB 12 IPC operation these lines indicate whether the SBI 34 successfully performed the system bus operation requested by the IO BUS command. The interpretation of IOACK and IOBUSY are as follows: |

| IOACK | IOBUSY | (ACTIVE HIGH) |
| --- | --- | --- |
| 0 | 0 | No response |
| 0 | 1 | Illegal case |
| 1 | 0 | IPC Command accepted |
| 1 | 1 | IPC Command rejected. |

| MNEMONIC | SOURCE | FUNCTION |
| --- | --- | --- |
| IOIREQ | IOP | The I/O Interrupt Request signal indicates that one or more IO Processors have an Interrupt pending. The SBI 34 passes the state of this line to the system CPU for processing. |
| IOINIT | SBI | The I/O Initialize signal is generated by the command SCU RESET. The command is passed through and redriven by the SBI 34; the signal being bused to each of the IO Processors. |
| IOPWRF | SBI | I/O Power Failure. Generated by system 10 power supply indicating the system power source is insufficient or non-existent. This signal may signify that the system 10 is being powered by battery |

| MNEMONIC | SOURCE | FUNCTION |
|---|---|---|
| SBI BUSY | SBI | back-up. SBI BUSY is an OR function of SBIBSYR and SBIBSYW (described below). This signal indicates, when asserted, that the SBI 34 is unable to accept IO BUS commands. This condition may result from the SBI's internal data buffers, to be described, being full. SBI BUSY is used by the IO Processor's arbitration logic to inhibit bus access while SBI BUSY is active. |
| SBIBSYR | SBI | SBI Busy on Read, indicating that no read requests (or any single cycle IO bus operations) from an IO Processor will be accepted by the SBI 34. |
| SBIBSYW | SBI | SBI Busy on Write, indicating that no further write requests from the IO Processor will be accepted by the SBI 34. |

That is, inasmuch as the SBI 34 comprises both read and write data buffers, certain data transfers between IO Processors and the SBI may still occur even though the SBI BUSY signal is asserted. For example, if the SBI read buffer is full an IO Processor may still write data to the SBI and hence to another system unit such as the memory. Thus, a mechanism is provide for allowing two types of IO Processors to be coupled to the IO BUS 42. A first type of IO Processor may respond only to the assertion of SBI BUSY and suspend IO BUS operations until this signal is deasserted. A second type of IO Processor may be responsive to SBI BUSY and/or to SBIBSYR and SBIBSYW. This second type of IO Processor may therefore selectively suspend IO BUS operations depending on whether the SBI is busy for read or write data. Thus, the bandwidth of the IO BUS 42 is effectively increased.

The SBI 34 receives the command bits C(0:3) and identification bits ID(0:4) from IO BUS 42 and performs the following operations.

WRITE MAIN MEMORY (W8, W32, W64)

There are three types of WRITE MAIN MEMORY operations supported by the IO Processors and SBI 34: byte (8 bits) write, single word (32 bits) write, and double word (64 bits) write. The double word write requires three IO BUS 42 cycles while the byte and word write operations require two IO BUS 42 cycles. All multiple I/O cycle operations take place in consecutive clock periods.

If an error occurs, the SBI 34 sends an ERROR REPORT command and an error status word along with the source SBI 34 ID to the source IO Processor, as will be described hereinafter.

There are two types of READ MAIN MEMORY operations supported by the I/O Processor and the SBI: single word (32 bits) read and double word (64 bits) read.

Main memory read operations consist of two separate IO BUS 42 arbitration operations. First, the IOP arbitrates for the IO BUS 42 and issues a read command accompanied by a system memory address in one bus cycle. Thereafter, the IOP relinquishes control of the bus. The SBI 34 receives the read command and address and retrieves the read data from main memory. The SBI 34 then arbitrates for the IO BUS 42 and returns the read data requested. If the SBI 34 detects a read error an ERROR REPORT command is issued to the source IO Processor along with the Error Status word and the source SBI ID.

A TEST AND SET command appears substantially the same as a READ MAIN MEMORY (R64 command) at the IO BUS 42 level. One difference relates to the manner in which the SBI 34 processes the retrieved main memory data. The SBI 34, after receiving the main memory data, issues the unmodified data to the source IO Processor and subsequently sets the MSB (Most Significant Bit) of the 64 bit memory data and writes the most significant byte back into the main memory location from which the byte was originally read. This operation requires the SBI 34 to perform a system bus READ and WRITE operation of main memory. One purpose of this command is to provide an IO Processor with a semaphore (the MSB of the 64 bit memory data). If one IO Processor performs TEST AND SET and finds that the MSB of the data read is "1" it determines that another IO Processor has control of a resource associated with the semaphore bit. Should the MSB be a "0" the IO Processor may gain control.

An I/O Self Test command is used for I/O diagnostic purposes. It transfers the contents of OR2 94 and OR3 96 out onto the IO BUS 42 then back in through the same IO Processor's receivers and into IR1 100 and IR2 102, respectively.

The SBI 34 also has self-test capability which is initiated by SCU 60 via SLB 64. An IPC from another system bus connection may thereafter send data (DATA[32:63]) for storage in the read buffer of the SBI 34. This data is thereafter sent, via the IO BUS 42, to the SBI 34 write buffer as two identical 32 bit words. The resulting 64 bit data may thereafter be transmitted as an IPC with data on SDATA [0:63]. A receiving bus connection may thereafter verify that SDATA[0:31]is equal to SDATA [32:63], thereby insuring the integrity of the SBI 34 read and write buffers and associated circuity and also the integrity of the IO BUS 42. The operation of the SBI 34 read and write buffers will be described in detail below.

An I/O READ REQUEST command is utilized during data communication between two IO Processors located on the same IO BUS 42. This command serves as a response command issued from a destination IO Processor to the source IO Processor indicating that the destination I/O device is ready for the next data transfer. No actual data is transferred with this IO BUS 42 command.

ERROR REPORT TO I/O PROCESSOR

There are five possible error conditions the SBI 34 can detect:

1. Illegal I/O Command — The SBI 34 detects an IO Processor command not permitted or recognizable.
2. System Bus Data Parity Error for IPC Operation — The SBI 34 detects bad data parity on the SB 12 during an IPC operation.
3. System Bus Data Parity Error for Memory Operation — The SBI 34 detects a bad main memory data parity on SB 12 during a Memory Read Operation.
4. Illegal System Memory Address — The MCU 22 receives a main memory address for a non-existent memory location.

5. Main Memory Data Parity Error — The MCU 22 receives an uncorrectable main memory data parity error during Memory Read Operation.

If, during a memory operation requested by an IO Processor, one of the above five possible error conditions is detected the SBI 34 issues onto the IO BUS 42 command signal lines (C0:C3) an error code. For the System Bus Inter-Processor Communication Operations if one of the above six possible error conditions is detected the SBI 34 issues onto the IO BUS 42 command signal lines a no operation (NO OP) code in order to complete the IO BUS cycle.

The I/O initialize command requires one IO BUS cycle to perform and serves to provide the system bus devices, specifically a CPU and the SCU 60, with the capability to selectively initialize or reset an individual IO Processor. To execute this command the SBI 34 places a NO OP code and the destination I/O address onto the IO bus 42 and asserts the IO bus signal SEL INIT. No data is transferred onto the IO BUS 42 during this bus operation.

A system bus IPC (W64) I/O command transfers data between the two IO Processors located on different IO Buses, such as between IOP1 44 and IOP1 45. The source IO Processor arbitrates for the IO BUS 42 and issues a control word, the SB IPC command and data to the source SBI 34 in 3 IO BUS cycles. The destination SBI 36 issues LD IR1, LD IR2 and data to the destination IO Processor 45 in two IO BUS cycles.

A system bus IPC (W32) command has four variations all of which involve transactions either between an IO Processor and a CPU or the SCU 60 or between IO Processors on different I/O Buses. The four versions of this command are explained as follows.

(A) SB IPC Control Message to CPU or SCU — This command is used by an IO Processor to transfer control information to a CPU or the SCU.

(B) SB IPC Control Message to IO Processor — This command is used for transferring control information between IO Processors on different IO buses.

(C) SB IPC Response Message — This command is employed during data transfers between IO Processors on different IO buses and indicates to the source IO Processor that the destination IO Processor is prepared for a next data transfer.

(D) SB IPC Data Transfer — This command is similar to the above described SYSTEM BUS IPC (W64) command except that one word of data instead of a double word of data is transferred.

Referring once again to the block diagram shown in FIG. 5 the operation of the previously described commands will now be described in greater detail.

For the Double Word Write (W64) operation during the first IO BUS cycle the IO Processor transfers the contents of the Bus Control Register (BCR) 88 and main memory address to the SBI 34. The BCR 88 contains both the IO BUS command and the source I/O address. The main memory address is located in Output Register 1 (OR1) 92. In the second and third IO BUS cycles the IO Processor transfers output data which are located in OR2 94 and OR3 96 to the SBI 34. The IO BUS command and the source I/O address are transferred through C(0:3) and ID0 and ID(1:4) respectively. The main memory address and the data are transferred through IODB(0:31). The IO Processor issues the IOHOLD signal in the first and second IO BUS cycles in order to perform this operation consecutively.

The single word (W32) and byte (W8) write operation is similar to the previous operation except that the data is transferred in the second IO BUS cycle.

For the double word read (R64) the source IO Processor arbitrates for the IO BUS 42 and transfers the contents of BCR 88 and main memory address to the SBI 34 in one IO BUS cycle. The BCR 88 contains both the IO BUS command and the source I/O address. The main memory address is located in OR1 92. The IO Processor thereafter relinquishes control of the IO BUS 42. Next, after the source SBI receives the read command and address, it retrieves the read data from main memory. The SBI 34 then arbitrates for the IO BUS and issues Load IR1 and Load IR2 IO BUS commands along with the main memory data words in two consecutive IO BUS cycles The main memory data is stored in Input Register 1 (IR1) 100 and Input Register 2 (IR2) 102 of the source IO Processor.

The single word read (R32) operation is similar to the previous operation except that only 32 bits of main memory data is transferred into IR1 100 of the source IO Processor.

The TEST AND SET IO BUS command appears the same as a main memory double word read operation at the IO BUS 42 level. First, the source IO Processor issues a main memory address and the TEST AND SET command to the SBI 34. After the SBI 34 receives the main memory data it issues LOAD IR1 and Load IR2 bus commands along with the unmodified main memory data words to the source IO Processor in two consecutive IO BUS cycles. The SBI 34 then sets the MSB of the 64 bit main memory data and writes the most significant byte back, via MCU 22, into the same main memory location. This operation requires the SBI to perform a system bus READ and WRITE operation of the main memory.

The system bus 12 IPC (W64) IO BUS command is initiated by the source IO Processor to transfer 64-bit data to a destination IO Processor located on another IO BUS within the same systems. In the first IO BUS cycle the source IO Processor transfers the contents of BCR 88 and OR1 92 to the source SBI 34. The BCR 88 contains the IO BUS command (System Bus IPC (W64)) and address of the source IO Processor. The OR1 92 contains the address of the destination SBI, system bus command and address of the destination IO Processor. The content of OR1 92 is transferred to a System Address Output Register (SAOR) of the source SBI 34. In the second and third IO BUS cycles the source IO Processor transfers the contents of OR2 94 and OR3 96 to the System Data Output Registers (SDOR) of the source SBI 34. The source SBI then attempts to transfer the contents of SAOR and SDOR to System Address Input Register (SAIR) and system Data Input Register (SDIR) of the destination SBI respectively through the system bus. The IOHOLD signal is generated by the source IO Processor in the first two IO BUS cycles. It is generated by the source SBI 34 in the remaining I/O cycles. Therefore, the IO BUS 42 can be frozen until the source SBI has completed the system bus transfer portion of the operation. The destination SBI (such as SBI 36) issues IO BUS commands LOAD IR1 and LOAD IR2 along with the data in SDIR to its associated IO BUS 43 in two consecutive IO BUS cycles. The 64-bit data is stored in IR1 and IR2 of the destination IO Processor.

In relation to the aforedescribed SB 12 IPC control messages, for an IPC message being transmitted to the CPU0 or CPU1 the following occurs. In the first IO BUS cycle the source IO Processor transfers the contents of BCR 88 and OR1 92 to the source SBI. The BCR 88 contains the IO BUS command (System Bus IPC (W32)) and address of the source IO Processor. The OR1 92 contains the address of the destination CPU, system bus command and message. The content of OR1 92 is transferred to the System Address Output Register (SAOR) of the source SBI. This command is a double cycle operation although no data is transferred in the second IO BUS cycle. The source SBI thereafter transfers the contents of the SAOR to the CPU.

For an IPC transfer to the SCU 60 in the first IO BUS cycle the source IO Processor transfers the contents of BCR 88 and OR1 92 to the source SBI. The BCR 88 contains the IO BUS command (System Bus IPC (W32)) and address of the source IO Processor. The OR1 92 contains address of the destination SCU 60 and system bus command. The content of OR1 92 is transferred to the SAOR of the source SBI. In the second IO BUS cycle the source IO Processor transfers the contents of OR2 94 to SDOR of the source SBI. The OR2 94 contains the message to be transferred. Thereafter the source SBI transfers the contents of SAOR and SDOR to SAIR and SDIR of the destination SBI respectively through the system bus. The destination SBI issues the IO BUS command "IPC Message to IPCR" along with the data in SDIR to the IO BUS in one IO BUS cycle. The 32-bit data is stored in the IR1 100 of the destination IO Processor.

Referring now to the SBI 34 block diagrams illustrated in FIG. 6a-f there will be described in more detail the operation of the SBI 34. Signal paths which flow between circuit elements shown on different sheets of the drawing are indicated by a circle having the destination figure number indicated therein.

As has been described, when an IO Processor accesses data in main memory it sends the physical address bits to the SBI 34 through the 32-bit IO Data Bus. An IO Address Input Register (IOAIR1) 110 (FIG. 6a) inputs the address bits so long as the SBI 34 is not in a busy state, that is, both SBIBSYR and SBIBSYW are asserted. The output of IOAIR1 110 is latched by an IO Address Input Latch (IOAIL) 112, allowing the pipelining of two stages of IO operations. Correspondingly, and as will be described, there are two IO Data Input Registers and two Command and Identification Input Registers. The output of IOAIL 112 is applied to a System Address Output Register (SAOR) 130 from where it is applied to the SA bus 14 through ECL Driver 132. An IO Parity Generator 113 and an IO Parity Checker 115 are provided for both generating an odd parity bit and checking the parity associated with the 32-bit IO address/data bus.

Figure 6:
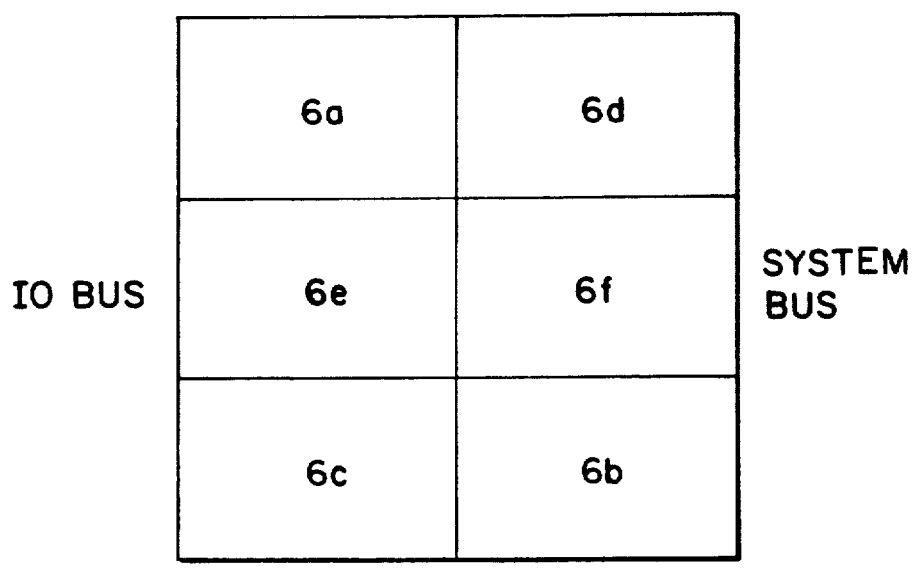
FIG. 6 is a diagram which shows the interrelationship of the individual block diagrams of FIGS. 6a-6f.
Figure 6A:
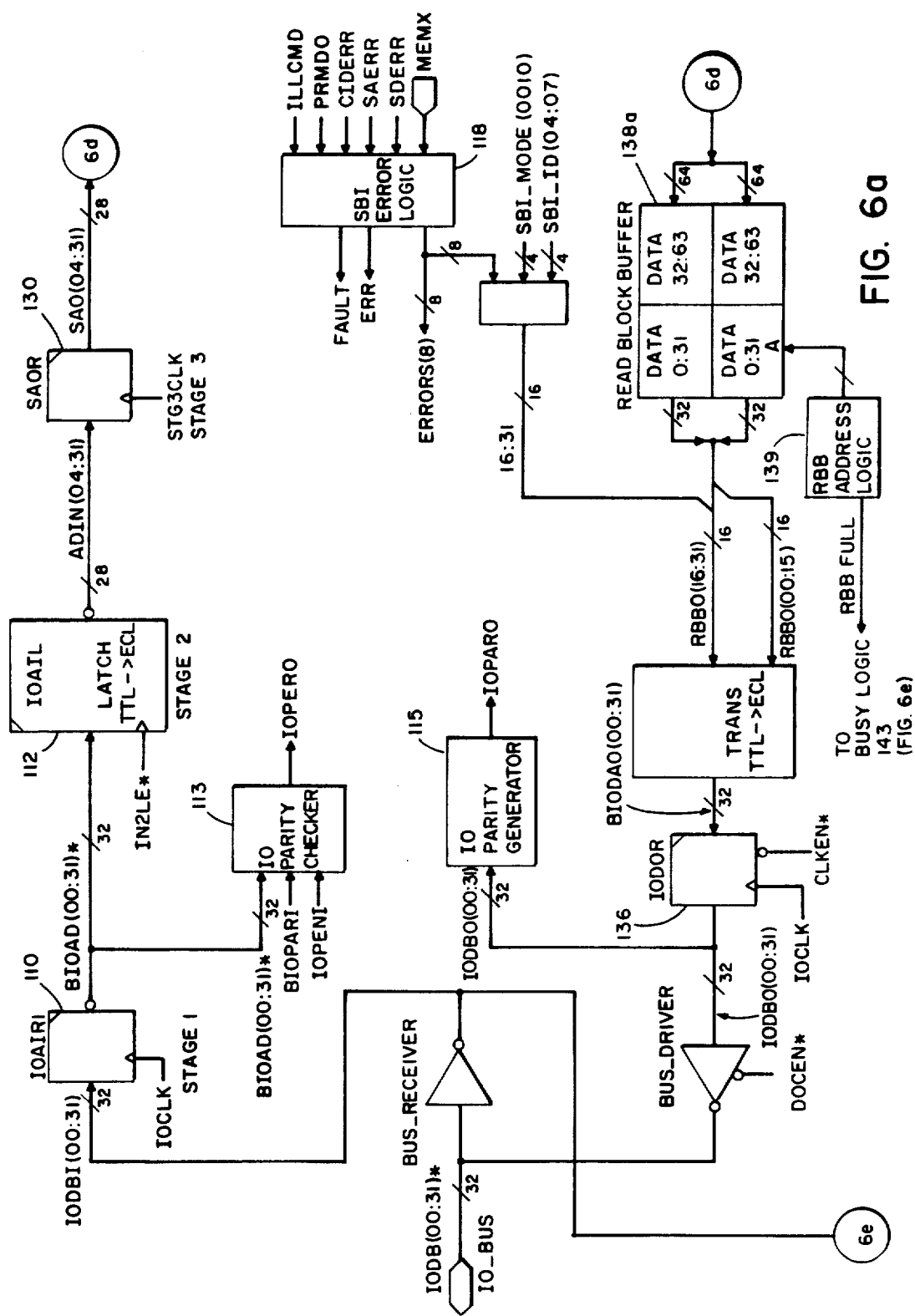
Figure 6B:
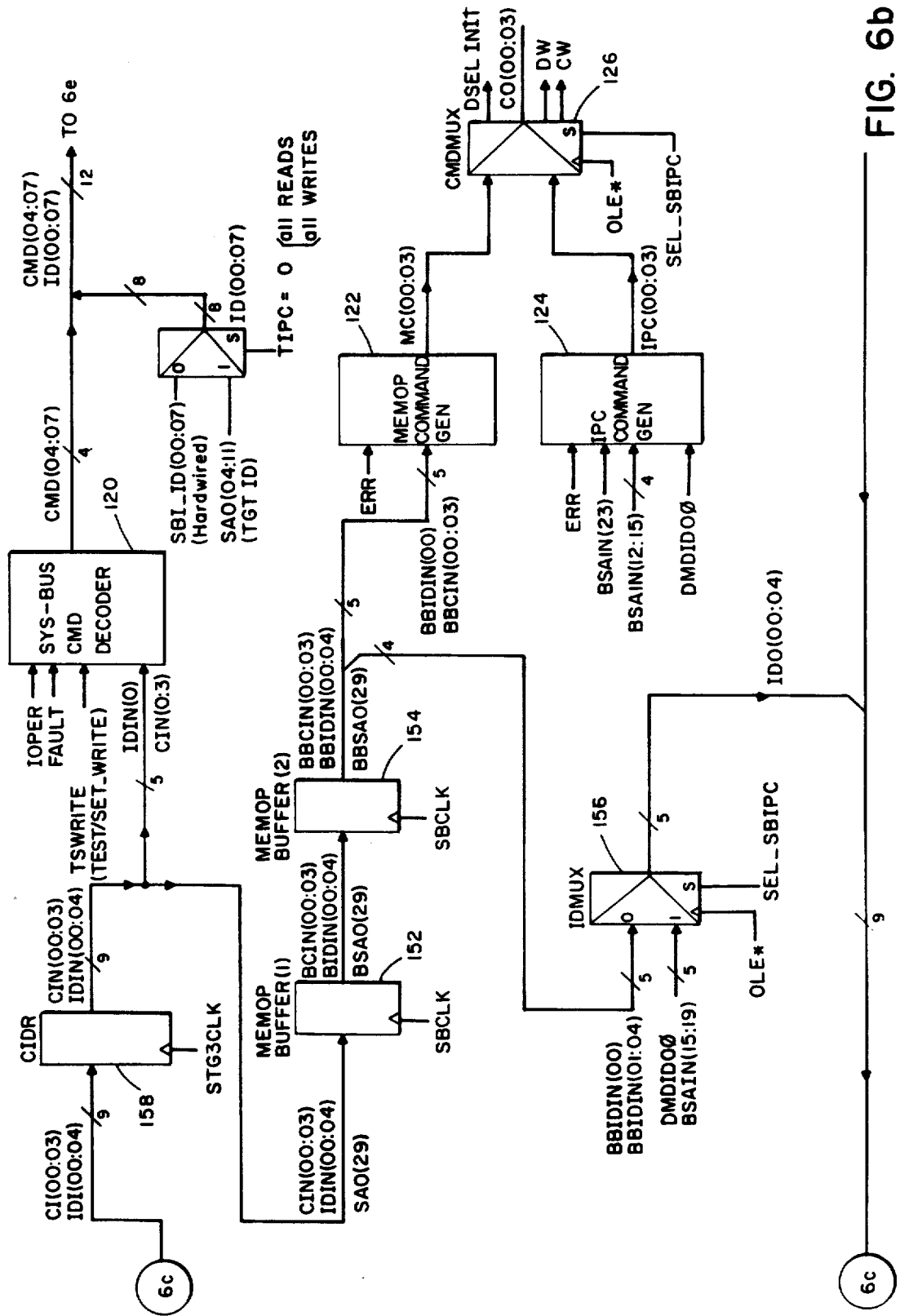
Figure 6C:
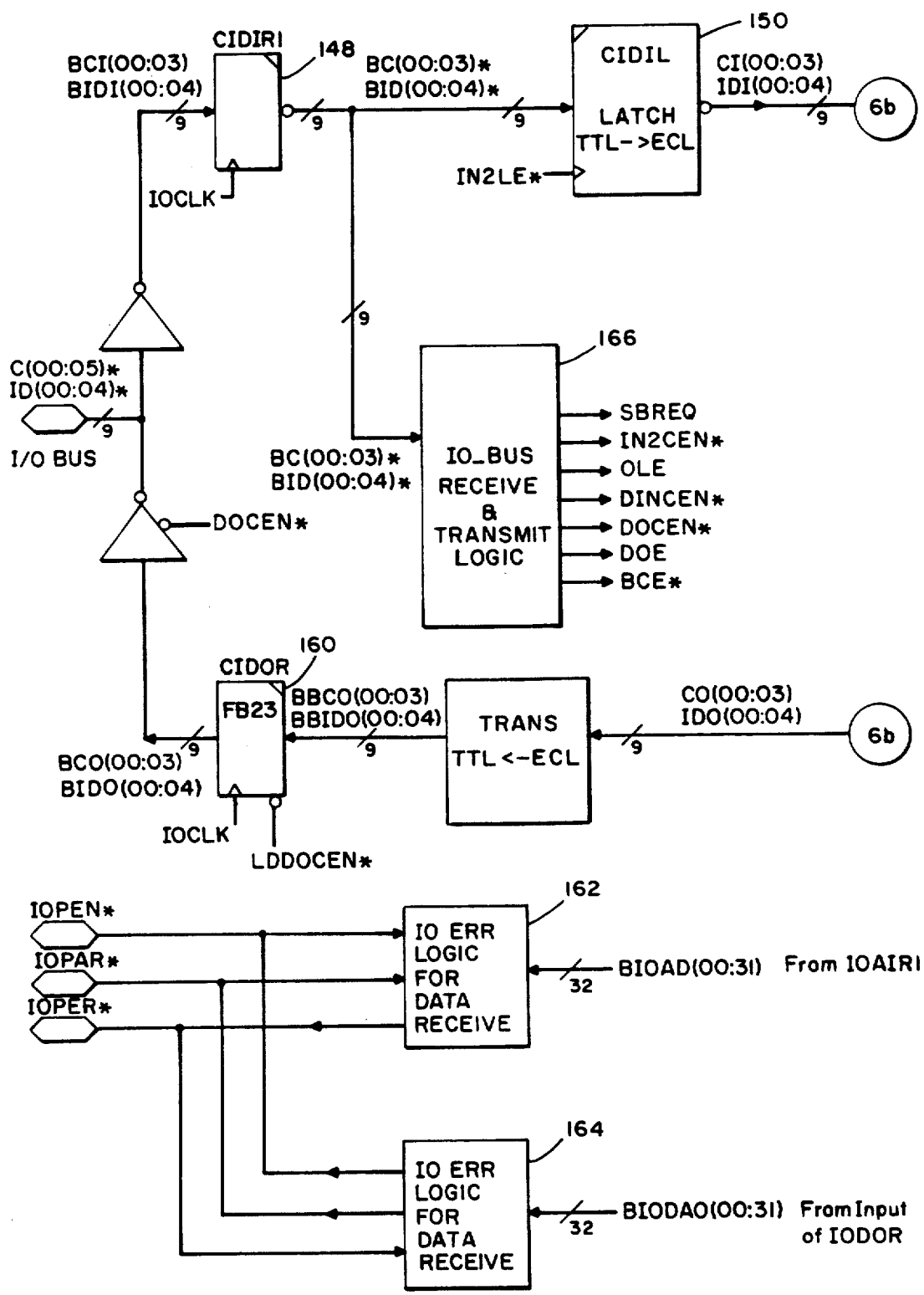
Figure 6D:
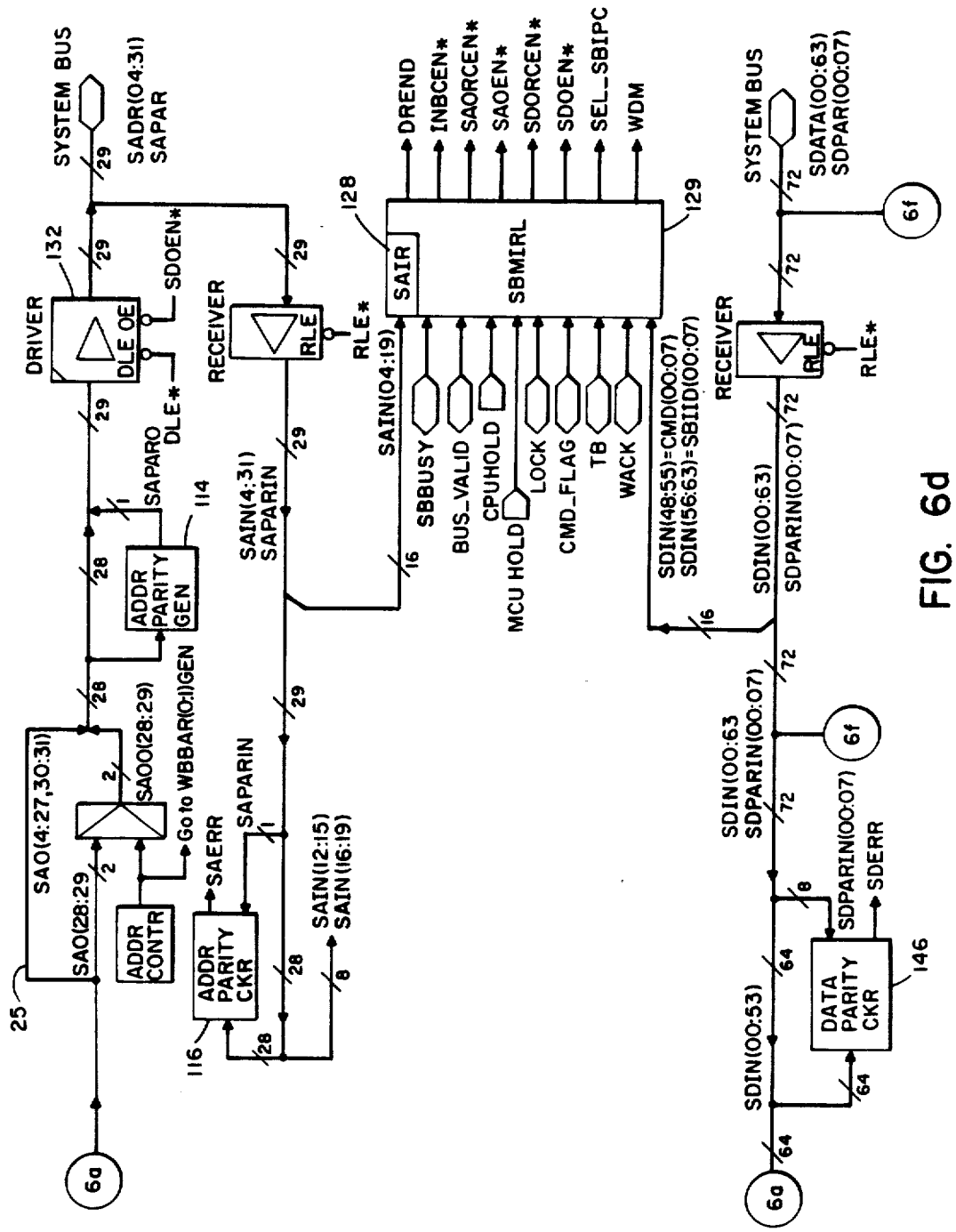
Figure 6E:
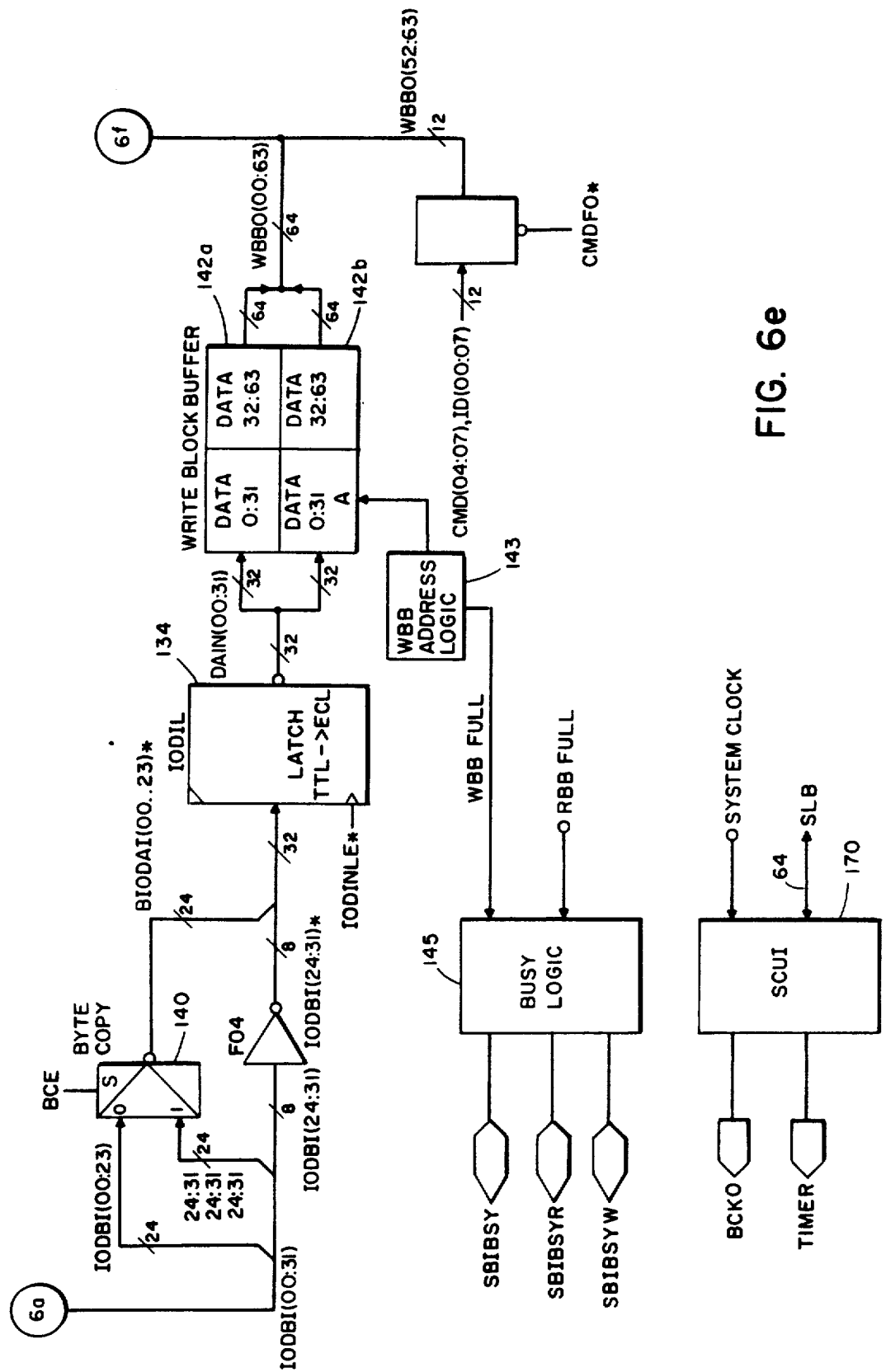

An Address Parity Generator 114 and an Address Parity Checker 116 (FIG. 6d) are separate and independent. The former generates an address odd parity bit for the 28 address bits received from the IO data bus. The latter checks the physical address bits along with the address parity bit received from the SA bus 14 and generates an address error (SAERR) signal which is sent to an SBI Error Logic device 118 (FIG. 6a). Error Logic device 118 has a plurality of outputs. A FAULT output is applied as an input to System Bus Command Decoder (SYS BUS CMD DECODER) 120 (FIG. 6b), while an ERR output signal is applied to a Memory Operation Command Generator (MEMOP COMMAND GEN) 122 and to an IPC COMMAND GEN 124 (FIG. 6b). The outputs of MEMOP COMMAND GEN 122 and IPC Command Gen 124 are multiplexed by CMDMUX 126 and, after being level translated, latched, and buffered, are applied to the IO bus C[00:03]signal lines (FIG. 6c).

The System Address Input Register (SAIR) 128 (FIG. 6d) comprises a portion of a System Bus Memory and IPC Response Logic Block (SBMIRL) 129 which receives the SA bus 14 address bits from MCU 22 for READ operations requested by an IO Processor. It also receives information from the SB 12 related to IPC operations. SBMIRL 129 is controlled in part by the states of the SBBSY, BUSVLD, CPUHLD, MCUHLD, LOCK, CMD FLAG, CMD and ID signal lines. SBMIRL 129 generates a plurality of output signals including a signal WDN, which indicates the completion of a write operation to the system bus 12 and a signal DREND at the end of a data return.

In accordance with one aspect of the invention SBMIRL 129 monitors the CMD and ID signals to determine that an IPC known as a START IO IPC is being requested. In this case the time required for the SBI to respond with Target Busy (TB), either true or false, and Write Acknowledge (WACK) is not fixed, but is a function of the time required for the SBI to synchronize communication with a particular IOP to which IO data is to be read or written.

The number of system bus cycles required for the return of TB (true) and WACK may vary from a minimum of three to a maximum of approximately eight cycles, based on an IO clock (BCKO) of 120 nanoseconds. The minimum number of system bus cycles for the return of TB false, indicating that the IPC was accepted, is approximately five cycles for a BCKO of 120 nanoseconds.

This variability in response time is accommodated, as illustrated in FIG. 3d, by the SBI driving, via SBMIRL 129, BSY after cycle 1, thereby preventing other bus connections access to the SB 12. That is, the bus connection generating the START IO IPC command drives BSY, in addition to CMDFLG and other appropriate signals, during cycle 1. The SBI decodes the occurrence of the START IO IPC command and thereafter continues to drive BSY for some n cycles. At the beginning of cycle n−1 the SBI deasserts BSY and in cycle n sets the states of TB and WACK according to the following table.

| TB | WACK | CONDITION |
| --- | --- | --- |
| 0 | 0 | IO Bus Error. |
| 1 | 0 | IO Bus Error. |
| 0 | 1 | START IO IPC accepted and acknowledged by the target IOP. |
| 1 | 1 | START IO IPC not accepted but acknowledged. The sender will generally reattempt the IPC in a later cycle. |

Thus, the variability arising from the asynchronous relationship between the IO BUS 42 and the SB 12 is accommodated by the SBI.

In accordance with another aspect of the invention the SBMIRL 129 is responsive to the assertion of either CPUHLD or MCUHLD during a data return cycle such that data received from SB 12 and written to the Read Block Buffer 138 (to be described) is overwritten with updated or corrected data. That is, during a normal data return BUSVLD is asserted and BSY is deasserted. If CPUHLD is also asserted it indicates that a cache retransmission may occur. If such retransmission does occur some number of cycles later during the assertion of CPUHLD BUSVLD will be asserted by the cache during the retransmission. The data being transmitted is expressive of data stored in the cache which is more up to date than the data originally returned from the MCU 22. That is, the cache data may have been recently modified.

Similarly, the assertion of MCUHLD during the data return cycle indicates that the returned data is in error and that corrected data is to be retransmitted by the MCU 22. In both of these cases the SBI will overwrite the previously received data, which is stored in one of the read block buffers 138, with corrected data before transferring the data to the requesting IOP.

Driver 132 is controlled by SDOEN, one of the outputs of SBMIRL 129, which is active during one system bus clock. This guarantees the transmission of 28-bit address and 1-bit address parity to the system address bus within one system bus cycle.

When an IO Processor writes data to the main memory, it sends the 32-bit data to the SBI 34 through the 32-bit IO Data Bus after the physical address is sent to the SBI 34 in the previous IO cycle. Data is transmitted through an IO Data Input Latch (IODIL) 134 (FIG. 6e) for from one to two cycles depending upon the type of WRITE operation.

IODOR 136 (FIG. 6a) transmits data from Read Block Buffers (RBB) 138a and 138b to the IO Data Bus. The data is typically the return data from the MCU 22. Data is transmitted through IODOR for from one to two IO cycles depending upon the type of READ operation. Each Read Block Buffer 138a and 138b has a capacity of two 32 bit words of data.

For the case wherein WBB 142 is full, that is when both WBB 142a and WBB 142b have data stored within, the IO BUS 42 signals SBI BUSY and SBIBSYR are asserted by Busy logic block 145, thereby informing the IO Processors that the SBI 34 is currently unable to accept further write requests.

In accordance with another aspect of the invention a Byte Copy function is performed by multiplexer 140 (FIG. 6e) which makes all eight bytes of a long word identical for WRITE BYTE operations. This facilitates the operation of the MCU 22 in extracting the BYTE information from the 64-bit SD bus 16. The operation of the WBB 142 is described in further detail below for the three different types of write operations.

WRITE BYTE — The eight-bit data is assigned to the least significant byte of the IO data bus, IODB(24:31). After passing through the BYTE COPY multiplexer 140 the output four bytes are identical. After being stored in the WBB 142 all eight bytes are identical. The storing is performed in one IO cycle. Thereafter, when the contents of WBB 142 are written to the SB 12, the 64 bit long word contains eight copies of the byte originally sent by an IOP.

WRITE WORD — A 32-bit word on the IO data bus is stored in the Write Block Buffer as two identical words. That is, WBB(0:15) is identical with WBB(32:47) and WBB(16:31) is identical with WBB(48:63). This storage is also performed in one IO cycle.

WRITE DOUBLE WORD — This operation requires two IO cycles to store the two words in the Write Block Buffer 142. In the first IO cycle after the first word is stored in the Write Block Buffer 142 the two words are identical as discussed in the previous paragraph. During the second IO cycle the second word only is stored in the second word of the Write Block Buffer. Thus, IODB(0:15) is stored in WBB(32:47) and IODB(16:31) in WBB(48:63). This last storage operation overwrites the information stored in the previous IO cycle.

The structure of RBB 138 (FIG. 6a) is identical with that the Write Block Buffer 142. The SBI 34 receives the return data from MCU 22 and stores it in the RBB 138a. The return data for a second READ operation is stored in the RBB 138b. A maximum of two IO read requests may be buffered in the SBI 34, if the requests occur in two successive IO bus cycles. After the data is stored in the Read Block Buffer 138 the data is returned to the source IO Processor which requested the READ operation. Only one word (32 bits) is sent over the IO data bus in each IO cycle. Successive system memory reads by IO Processors results in the read data being returned to the IO Processors in the same order in which the read requests were made. The SBI 34 accepts a READ operation only if any one part of the RBB 138 is available, i.e. the data stored therein has been transferred to the requesting IO Processor successfully. If the RBB 138 is full the signals SBI BUSY and SBIBSYR are asserted by block 145, thereby informing the IO Processors that the SBI 34 is currently unable to accept further read requests.

The two RBBs 138 are allocated to receive any relevant system bus transaction, either solicited activity such as a data return (DR) or unsolicited activity, such as most types of IPC. Addressing logic 139 determines the state of the RBBs. The state of the RBBs 138 may be generally defined as follows.

Whether either or both are available for allocation and which available one is to be allocated. RBB 138a is the preferred buffer when both are available.

Whether either or both RBBs 138 are allocated for DR from the system bus and the correlation, in conjunction with the MEMOP buffers 152 and 154, of the DR with the proper RBB 138.

Determination of whether an RBB 138 is ready for output to the IO Bus, and outputting the data at the proper time and order relative to the other RBB if the other RBB is in a similar state.

And, whether either RBB 138 can receive an unsolicited or unexpected system bus transaction (most IPCs).

Address logic block 143 determines the state of the WBBs 142. If any WBB is empty, it may be used for temporary storage of data from the IO BUS 42 bound for the system bus. The algorithm for control of the WBBs 142 may be generally defined as follows.

Immediately after an available WWB 142 is written from the IO BUS, it is transferred to system bus timing and made available for transmission to the system bus. The other buffer is then unconditionally made available to the IO BUS 42 to receive any transaction unless the contents of the buffer hasn't yet been outputted onto the system bus.

The purpose of the MEMOP buffers 152 and 154 (FIG. 6b) is to store IOC command and ID information for the return of data/error messages to an IOP.

IOPs can issue reads, writes, or IPCs on the IO BUS 42. When one of these actions occurs, the particular command along with the ID of the IOP that issued the command is latched by the SBI 34. This information is propagated through the SBI input stages (STAGE 1, STAGE 2 and STAGE 3). Generally, STAGE 1 and STAGE 2 operate off of the IO BUS 42 clock and may be identified with IOAIR1 110 and IOAIL 112 (FIG. 6a), respectively. STAGE 3 operates from the higher speed system bus clock and may be identified with SAOR 130. When the command is loaded into SAOR 130 the SBI 34 issues a corresponding command on the System Bus. At this time the command/ID information must be retained by the SBI 34 so that in the case of a read the data can be returned to the requesting IOP or, in the case of a write operation or IPC, an error message can be returned to the requesting IOP if needed. The IOC command/ID information is stored in the MEMOP Buffers 152 and 154 until used or no longer needed. Inasmuch as the SBI 34 is capable of processing two transactions at any one time, two MEMOP buffers are provided to implement the two stage transaction pipeline.

Figure 2:
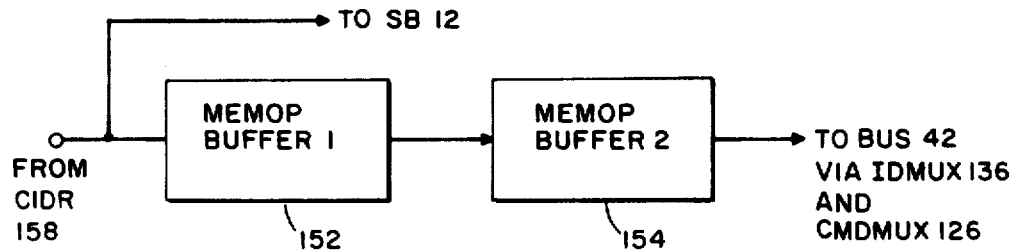
FIG. 2 shows the MEM OP Buffers.

In general, command/ID information is first stored in MEMOP Buffer 1 152, then MEMOP Buffer 2 154 as shown in FIG. 2 and in FIG. 6b.

MEMOP Buffer 1 152 is loaded when any system bus operation is initiated by the SBI 34. MEMOP Buffer 2 154 is loaded on any of the following four conditions:

(a) MEMOP Buffer 1 152 is full and MEMOP Buffer 2 154 is empty;
(b) MEMOP Buffer 1 152 is full and MEMOP Buffer 2 154 has a write command stored within and no error has occurred while performing the write;
(c) MEMOP Buffer 1 152 is full and MEMOP Buffer 2 154 has an IPC command stored within and no error has occurred while transmitting the IPC; and
(d) MEMOP Buffer 1 152 is full and MEMOP Buffer 2 154 is being cleared.

MEMOP Buffer 1 152 is cleared whenever MEMOP Buffer 2 154 is loaded. MEMOP Buffer 2 154 is explicitly cleared only when the SBI 34 initiates an IOBUS operation (i.e. a data return to an IOP). It should be noted from conditions (b) and (c) above that since successful writes and IPCs do not cause the SBI 34 to return any information to an IOP, these commands stay in MEMOP Buffer 2 154 until another command is received from an IOP at which time MEMOP Buffer 2 154 is overwritten.

The Data Parity Generator 144 (FIG. 6f) and the Data Parity Checker 146 (FIG. 6d) are separate and independent. The former generates one data parity bit for data received from IO data bus. The latter checks the data bits along with the data parity bit, one for each byte, received from the SB 12 and generates an error signal SDERR which is sent to the SBI Error Logic 118.

In the first IO cycle, during the time that the IOAIR1 110 receives 28-bit physical address information, a Command and Identification Input Register (CIDIR1) 148 (FIG. 6c) receives four IO Command bits and five IO Processor ID bits from the IO BUS. The latched outputs of CIDIR1 148 are applied to a Command ID Input Latch (CIDIL) 150, the outputs of which are applied to a Command ID Register (CIDR) 158 (FIG. 6b). The two previously described registers MEMOP Buffer 1 152 and MEMOP Buffer 2 154 (FIG. 6b) store the IO ID and IO Command bits from CIDR 158 for two consecutive operations, thereby facilitating the pipelining of requests. An ID Multiplexer (IDMUX) 156 selects either four IO ID bits for those operations which send data back to the source IO Processor or selects SA(16:19), which indicate the IO controller's ID for SB 12 IPC operations. The output of IDMUX 156 is level translated and applied to a Command ID Output Register (CIDOR) 160 (FIG. 6c) before being driven to the IO BUS.

Receive and Transmit IO Error Logic blocks, 162 and 164, are coupled to an IO BUS Parity signal line (IOPAR*), an IO BUS Parity Enable signal line (IOPEN*), and an IO BUS Parity Error signal line (IOPER*).

An IO BUS Receive and Transmit Logic 166 block receives the command and ID bits from the IO BUS 42 and generates a plurality of control signals which control the operation of SBI 34 circuitry related to the operation of the IO BUS.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. An information processing system comprising:
a system memory having a plurality of storage locations for storing information units, each of the storage locations being defined by an address;
a system bus coupled to the system memory and having a plurality of signal lines for expressing at least the system memory addresses and the information units, the system bus signal lines operating at a first predefined set of voltage levels;
at least one I/O processor for coupling to an I/O device and comprising means for inputting information units from the I/O device and for outputting information units to the I/O device;
an I/O bus coupled to the one or more I/O processors, the I/O bus having a plurality of signal lines for expressing system memory addresses and the information units, the I/O bus signal lines operating at a second predefined set of voltages levels;
interface means bidirectionally coupled between the system bus and the I/O bus and being operable for transferring system memory addresses and information units between the I/O bus and the system bus, the interface means comprising means for converting said first predefined set of voltage levels to said second predefined set of voltage levels and said second predefined set of voltage levels to said first predefined set of voltage levels;
said interface means further comprising:
first buffer storage means for storing a predetermined number of information units received from the I/O bus prior to the transmission of the information units to the system bus;
second buffer storage means for storing the predetermined number of information units received from the system bus prior to the transmission of the information units to the I/O bus; and
means, responsive to the storage of information units in the first and the second buffer storage means, for asserting a plurality of I/O bus buffer status signal lines, the buffer status signal lines comprising:
a first signal line for indicating to the I/O processor or I/O processors that the first buffer storage means has stored the predetermined number of information units;

a second signal line for indicating to the I/O processor or I/O processors that the second buffer storage means has stored the predetermined number of information units; and a third signal line for indicating to the I/O processor or I/O processors that either the first buffer storage means or the second buffer storage means has stored the predetermined number of information units, wherein the first predefined set of voltage levels includes emitter coupled logic (ECL) voltage levels and wherein the second predefined set of voltage levels includes transistor-transistor logic (TTL) voltage levels, and wherein said system bus comprises a data bus having 64 data lines and wherein said first buffer storage means and said second buffer storage means each comprise a plurality of 64 bit storage locations.

2. An information processing system as set forth in claim 1 wherein said I/O bus comprises an I/O data bus having 32 data lines.

* * * * *